United States Patent [19]
Seki et al.

[11] Patent Number: 5,602,748
[45] Date of Patent: Feb. 11, 1997

[54] AREA MACHINING METHOD

[75] Inventors: Masaki Seki, Tokyo; Takashi Takegahara, Hachioji; Shigetoshi Takagi; Shinya Nakamura, both of Yamanashi, all of Japan

[73] Assignee: FANUC Ltd., Japan

[21] Appl. No.: 377,402

[22] Filed: Jan. 24, 1995

[30] Foreign Application Priority Data

Feb. 17, 1994 [JP] Japan ..................... 6-020473

[51] Int. Cl.$^6$ .............. G06F 19/00; G06G 7/64; G06G 7/66
[52] U.S. Cl. ................. 364/474.29; 364/474.34; 318/570
[58] Field of Search .............. 364/474.29, 474.34, 364/474.32, 474.33, 474.18

[56] References Cited

U.S. PATENT DOCUMENTS

| | | | |
|---|---|---|---|
| 3,969,615 | 7/1976 | Bowers et al. | 235/151.11 |
| 4,723,203 | 2/1988 | Kishi et al. | 364/171 |
| 5,121,334 | 6/1992 | Riley et al. | 364/474.05 |

Primary Examiner—Roy N. Envall, Jr.
Assistant Examiner—Monica Lewis
Attorney, Agent, or Firm—Staas & Halsey

[57] ABSTRACT

An area machining method capable of generating tool paths with no insufficient cut portion. First, a part profile contour indicating a profile contour for area machining and various machining conditions such as tool radius, depth of cut and the like are preset. Then the outmost offset contour and other subsequent offset contours are obtained, the outmost offset contour being offset along the part profile contour by an amount of the sum of a tool radius and finishing allowance, and the other subsequent offset contours being offset repeatedly from the outmost offset contour in sequence by an amount of depth of cut in the inside direction. Next, contours of insufficient cut portions which are produced between adjacent offset contours are obtained. Subsequently, tool paths each of which connects between offset contours and between an offset contour and a corresponding insufficient cut portion contour are outputted. At this time, insufficient cut portion contours are added to tool paths by changing a tool path to an insufficient cut portion contour if the insufficient cut portion contour is present near the current path while outputting an offset contour as a tool path.

9 Claims, 12 Drawing Sheets

AREA MACHINING METHOD

BACKGROUND OF THE INVENTION

(1) Field of the Invention

The present invention relates to an area machining method, and more particularly, to an area machining method of removing within a specified arbitrary area in a workpiece whereby a tool path without insufficient cut portion can be generated.

(2) Description of the Related Art

Using an automatic programing apparatus, when a part profile contour is specified and an area desired to be left uncut is defined in the form of an island, a program for area machining to remove within the specified part profile contour is generated so as to leave the island. When this automatic programming apparatus generates a tool path for cutting off a specified arbitrary area in a workpiece, the tool path for machining is selected as short as possible to reduce the machining time. Typically, the length of a tool path can be decreased by increasing depth of cut. However, some portions desired to be removed can be left uncut depending on the relationship among a tool diameter, depth of cut, and the like. Such the uncut portion or insufficient cut portion occurs when the depth of cut becomes larger than tool diameter, for example, such as when cutting at an acute-angled corner.

Conventionally, occurrence of such the insufficient cut portion is prevented by covering the area to be cut by the adjacent tool paths thereof by decreasing an amount of depth of cut. Alternatively, area machining is carried out disregarding occurrence of an insufficient cut portion, then the portion left uncut as insufficient cut is manually removed later.

As mentioned above, heretofore, occurrence of the insufficient cut has been dealt with by decreasing the depth of cut or by manually removing the insufficient cut portion later. However, reduction of the depth of cut increases the length of the tool path, and the later manual cutting of the insufficient cut portion is labor intensive for post processes. Consequently, in either case, there has been a disadvantage that the machining time is increased.

SUMMARY OF THE INVENTION

The present invention aims to remedy the above disadvantage and to provide an area machining method generating a tool path which will also remove an insufficient cut portion when any insufficient cut is predicted to occur during generation of a tool path for area machining by an automatic programming apparatus.

To solve the above problem, there is provided in accordance with the present invention an area machining method for removing within a specified arbitrary area in a workpiece, comprising the steps of setting a part profile contour and various machining conditions, obtaining an outmost offset contour which is offset along the part profile contour by at least an amount of tool radius in the inside direction, and other offset contours which are sequentially offset by an amount of depth of cut in the inside direction from the outmost offset contour, obtaining insufficient cut portion contours each of which is produced between corresponding adjacent offset contours, and outputting tool paths each of which connects between corresponding adjacent offset contours and between the corresponding offset contour and insufficient cut portion contour with the shortest distance.

According to the procedure mentioned above, offset contours are obtained in accordance with a preset part profile contour and preset various machining conditions. Then, whether any insufficient cut portion is present between adjacent offset contours or not is determined. If present, then the contour of the insufficient cut portion is obtained. A tool path on which a tool moves is outputted sequentially as described below. That is, in principle, a tool traces each of the previously obtained offset contour as a tool path. However, once the tool encounters an insufficient cut portion in course of the tracing, the tool shifts the contour of the insufficient cut portion to use as the tool path. When the insufficient cut portion contour ends, then the tool returns to the previous offset contour to use as the tool path.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENT

One embodiment of the present invention is described hereinafter in conjunction with the accompanying drawings.

Figure 1:
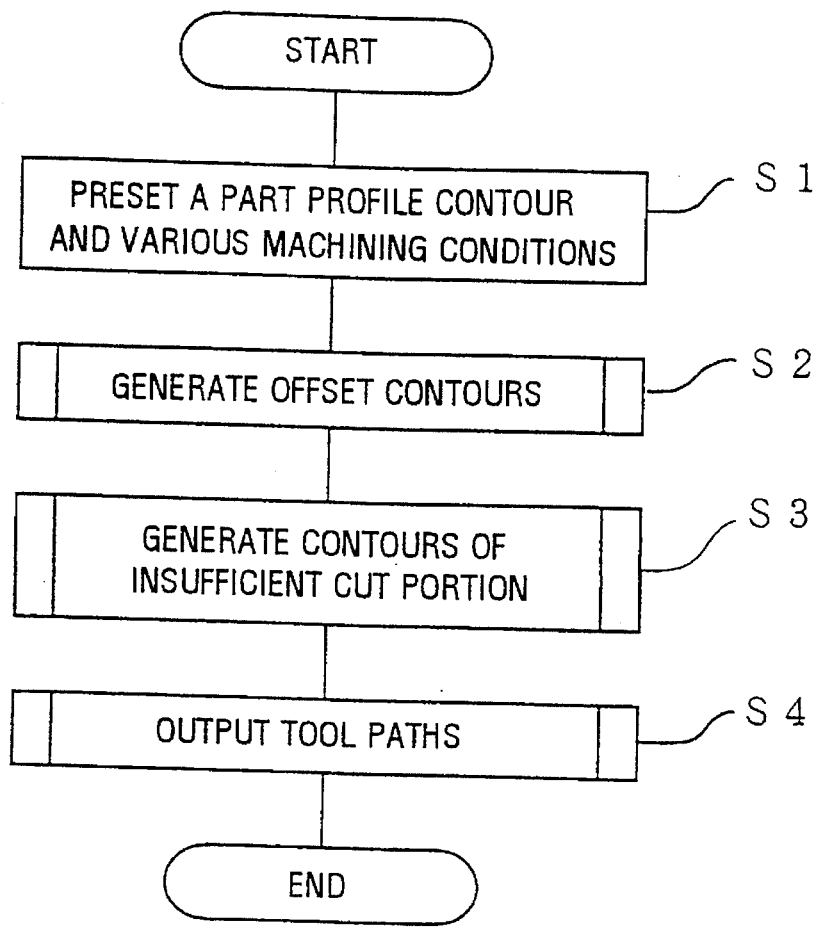
FIG. 1 is a flowchart illustrating an area machining method in accordance with the present invention.

FIG. 1 is a flowchart illustrating an area machining method in accordance with the present invention. Referring to FIG. 1, according to an area machining method of generating a tool path for area machining operations, a part profile contour and various machining conditions are preset by means of an automatic programming apparatus (step S1). That is, a part profile contour representing a contour of an area desired to be removed from a workpiece and various machining conditions such as amounts of tool diameter, depth of cut, finishing allowance, and the like are preset first.

Next, offset contours are generated (step S2). That is, the outmost offset contour which is offset along the part profile contour which is preset in step S1 by an amount of the sum of a tool radius and finishing allowance in the inside direction. After that, in the inside direction of the outmost offset contour, respective offset contours are obtained by repeatedly offsetting by the amount of depth of cut.

Then a contour of an insufficient cut portion produced between adjacent offset contours is generated (step S3). In previous step S2, the respective offset contours are obtained by repeatedly offsetting by the amount of depth of cut. An insufficient cut portion is produced especially at an acute-angled corner. Therefore, the insufficient cut portion produced at the corner is detected and the contours of the insufficient cut portion are obtained.

Finally, a tool path along which a tool actually passes is outputted (step S4). That is, a tool traces the offset contour obtained in step S2 as a tool path and if the tool encounters an insufficient cut portion in the course of the tracing, then the tool shifts to and traces the contour of the insufficient cut portion obtained in step S3. When the contour of the insufficient cut portion ends, then the tool returns to use the previous offset contour as the tool path. When the offset contour ends, then the tool shifts to use the adjacent offset contour as the tool path. In such a way, a continuous tool path is outputted.

Figure 2:
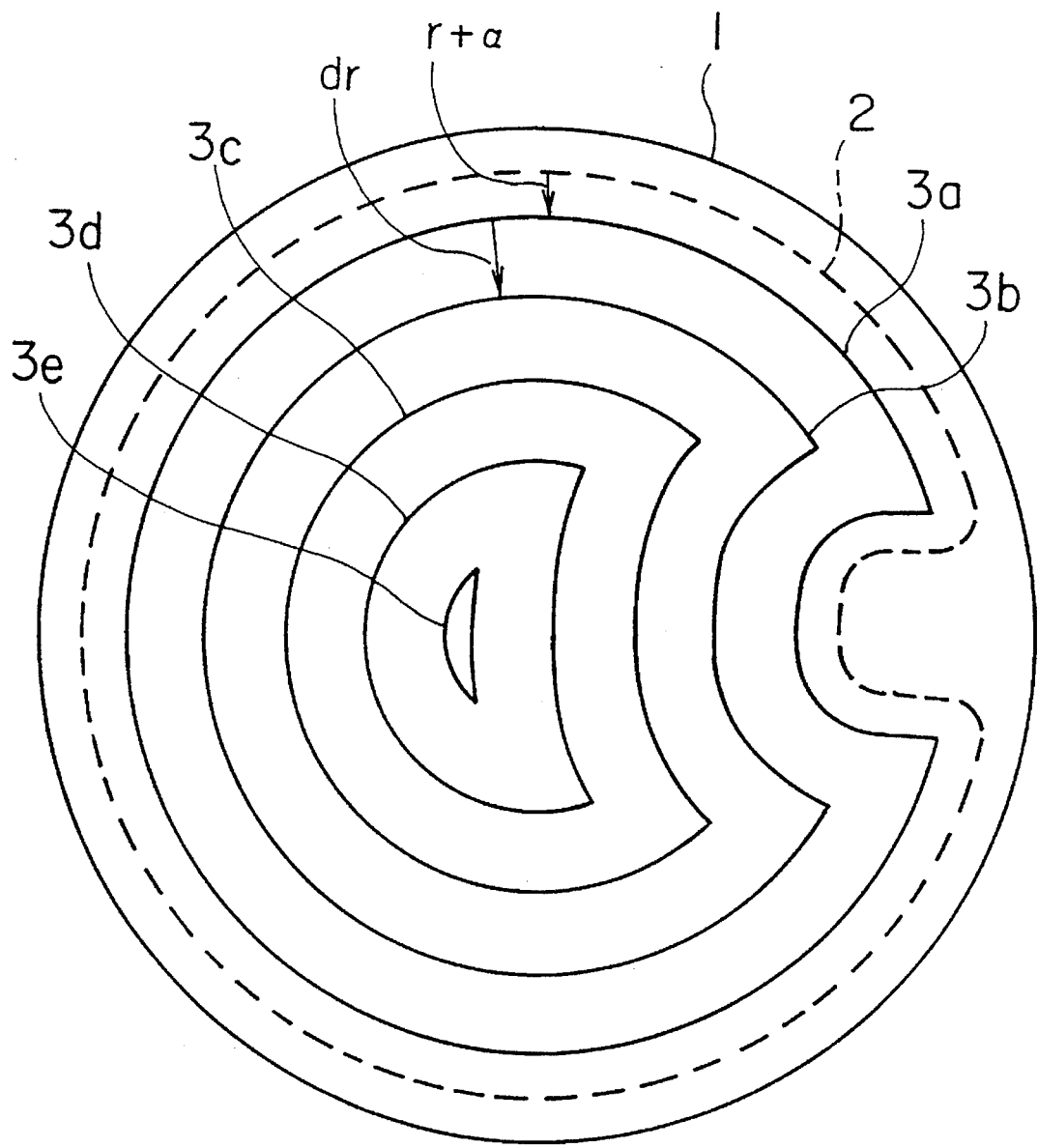
FIG. 2 is an illustrative drawing showing processes when offset contours are generated.

Next, processes after generation of the offset contours are described below in detail. FIG. 2 is an illustrative drawing showing processes during these offset contours are generated.

Referring to FIG. 2, reference numeral 1 indicates a workpiece on which the area machining is performed. Inside of a part profile contour 2 indicated by dotted lines on the surface of the workpiece is supposed to be removed to specific depth. In order to generate offset contours, first, it is necessary to generate the outmost offset contour 3a. This outmost offset contour 3a is generated at the position which is offset from a part profile contour 2 by an amount of tool radius r and finishing allowance α in the inside direction, and aligns to a tool center line when the tool moves.

Subsequently, the second offset contour 3b is generated at the position which is offset from the outmost offset contour 3a by an amount of preset depth of cut dr in the inside direction. Similarly, the 3rd, 4th, and 5th offset contours 3c, 3d, and 3e are respectively generated by repeatedly offsetting by the amount of depth of cut in the inside direction.

Figure 3:
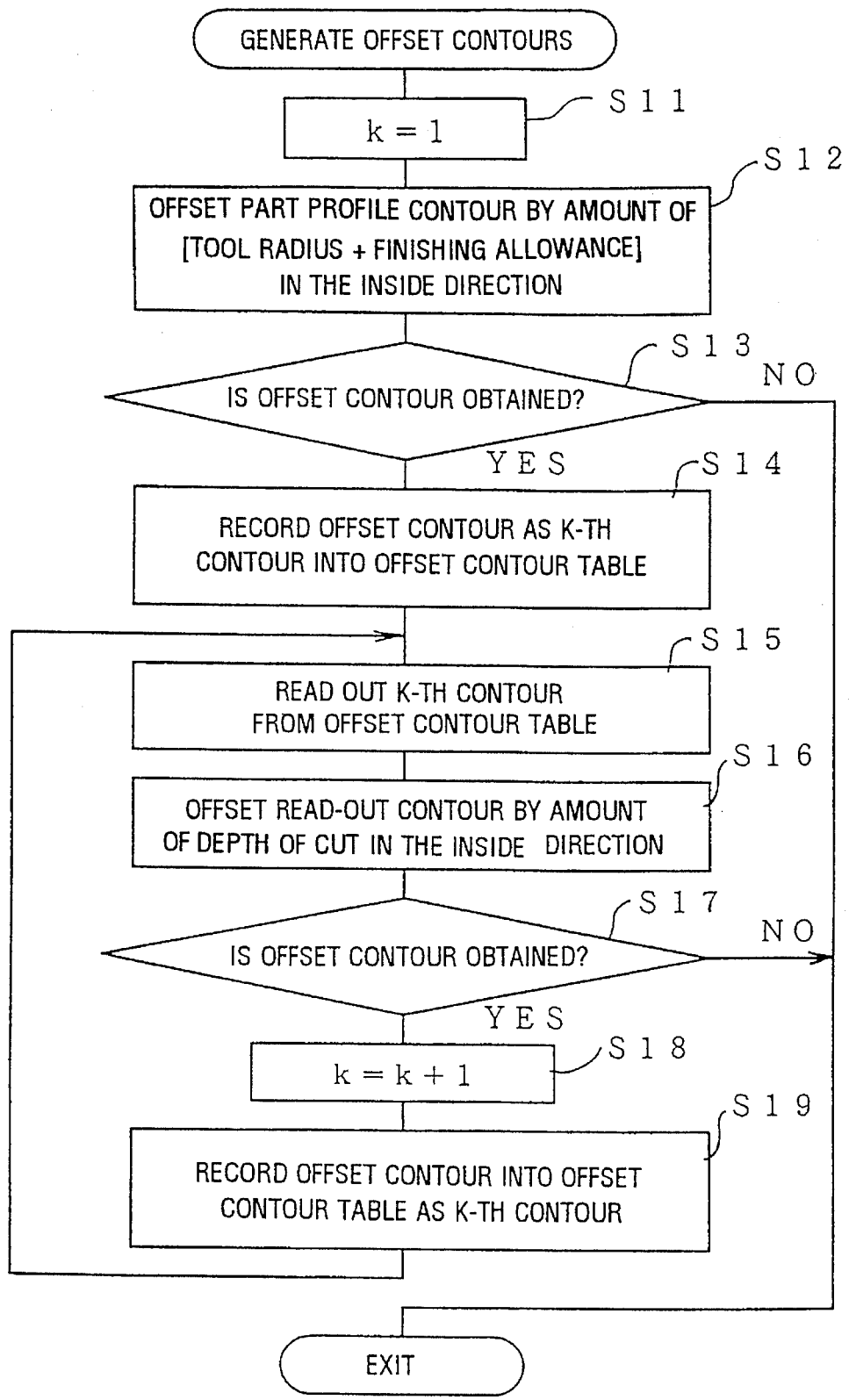
FIG. 3 is a flowchart illustrating processes for generating offset contours in detail.

FIG. 3 is a flowchart illustrating processes for generating offset contours in detail.

Referring to FIG. 3, first, a variable k representing an offset contour number is initialized to 1 (step S11). Then a preset part profile contour is offset by an amount of [tool radius+finishing allowance] in the inside direction (step S12). At this time whether an offset contour is obtained or not is determined (step S13). If not, then flow returns from this offset contour generation processes. On the other hand, if obtained, then the obtained offset contour is recorded into an offset contour table as the k-th offset contour, in this case, as the 1st offset contour (step S14). Thereby, the outmost path comprising a closed curve which aligns to the tool center line is obtained along the part profile contour.

Next, the k-th contour is read out from the offset contour table (step S15), and the read-out contour is offset by an amount of depth of cut in the inside direction (step S16). At this time, whether the offset contour is obtained or not is determined (step S17). If the offset contour is not obtained, flow returns from this offset contour generation processes. If the offset contour is obtained, then the variable k is incremented by one (step S18) and the obtained offset contour is recorded in the offset contour table as the k-th offset contour (step S19). After that, flow returns to step S15, and steps from S15 to S19 are repeated for obtaining respective offset contours which are acquired by repeatedly offsetting by the amount of depth of cut in the inside direction until it becomes impossible to obtain any offset contour.

In the offset contour table, a number identifying which the obtained offset contour is, and data of the various elements for providing the obtained offset contours are stored. That is, if the obtained offset contour is a line, coordinates of the starting point and the end point thereof are stored in the table, and if a circular arc, coordinates of the starting point, the end point, and the center point of the arc, data of radius and rotary direction, and a number indicating which the element of the offset contour is.

Figure 4:
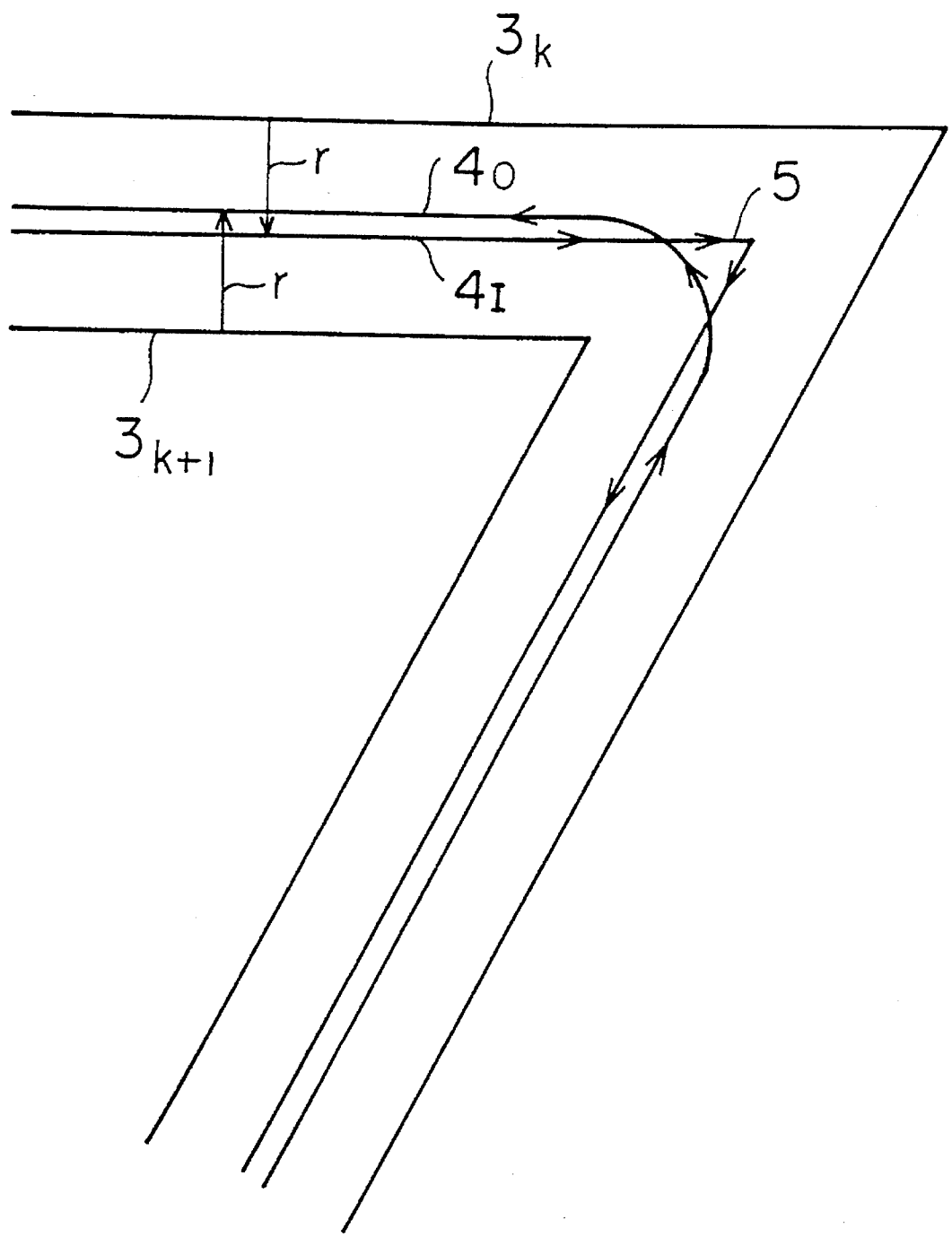
FIG. 4 is an illustrative drawing to show processes when an insufficient cut portion is detected.
Figure 5:
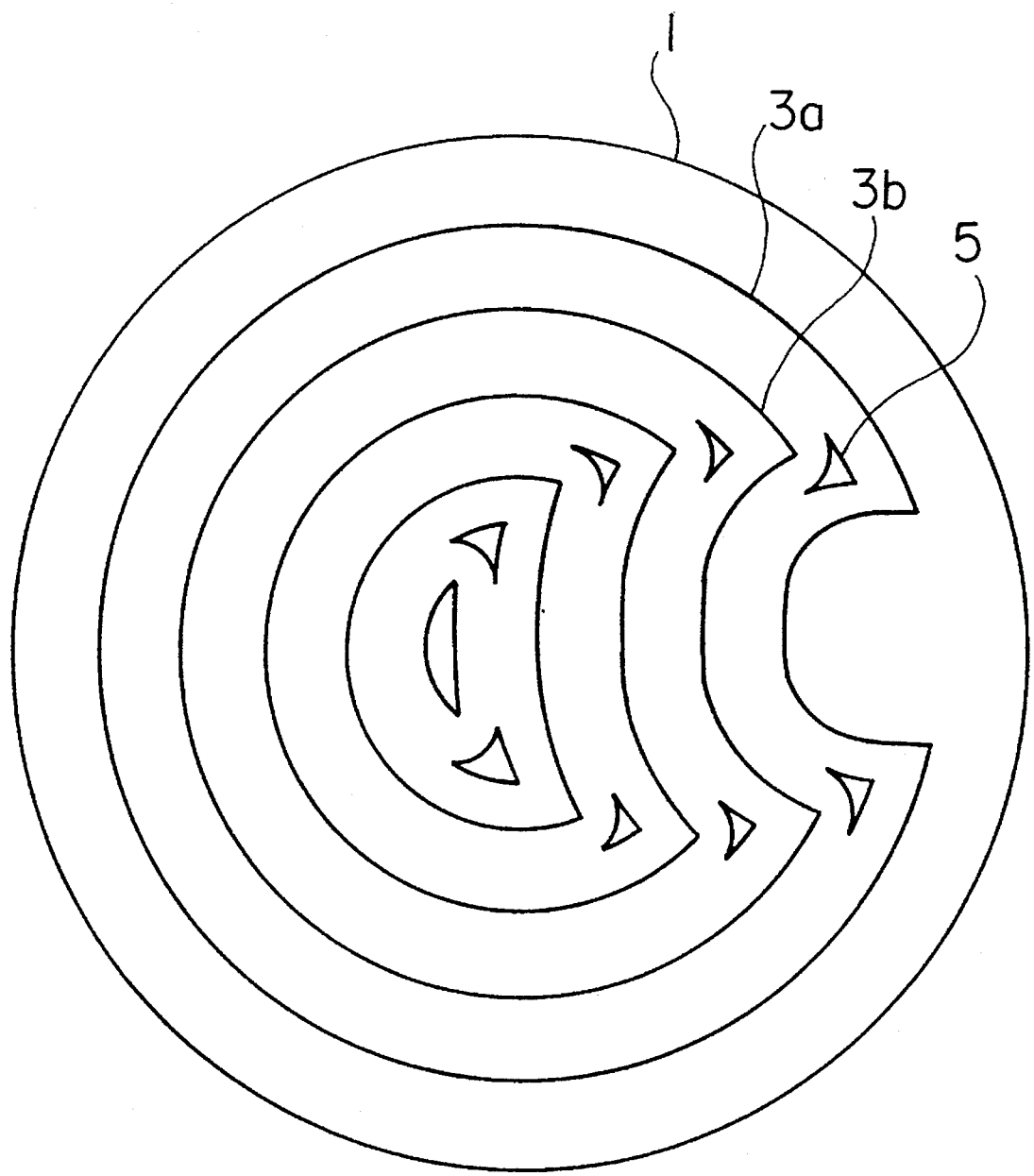
FIG. 5 is an illustrative drawing to show a state when a contour of an insufficient cut portion is generated.

After all the offset contours are obtained as mentioned above, flow advances to processes for generating a contour of insufficient cut portion. FIG. 4 is an illustrative drawing to show the processes when an insufficient cut portion is detected and FIG. 5 is an illustrative drawing to show a state when a contours of an insufficient cut portion is generated.

Especially, an insufficient cut portion caused at an acute-angled portion can be detected by offsetting adjacent offset contours by an amount of tool radius among those offset contours which were sequentially generated by repeatedly offsetting by an amount of specified depth of cut, then synthesizing those contours obtained thereby.

This is described in detail with reference to FIG. 4. Referring to FIG. 4, adjacent two offset contours, for example, the k-th offset contour $3_k$ and the (k+1)-th offset contour $3_{k+1}$ are given and there is an acute-angled corner at a portion. First, a contour $4_O$ is obtained by offsetting the inside offset contour $3_{k+1}$ by an amount of tool radius r in the outside direction, then a contour $4_I$ is obtained by offsetting the outside offset contour $3_k$ by an amount of tool radius r in the inside direction. To these contours $4_O$ and $4_I$, respective traveling directions are given. For example, the traveling directions of the contour $4_O$ and contour $4_I$ are directed to counterclockwise and to clockwise, respectively. The insufficient cut portion is the area on which either and both two profiles according to contours $4_O$ and $4_I$ are not overlapped and in which the distance from the inside offset contour $3_{k+1}$ exceeds an amount of tool radius r. Specifically, the insufficient cut portion is acquired by obtaining the area on which either and both two profiles are overlapped and obtaining the contour which has the defined direction same as that given to the contour $4_I$ among these contours to generate an insufficient cut portion contour 5. FIG. 5 shows a state when the insufficient cut potion contour 5 obtained as mentioned above is generated. In the illustrated example, the insufficient cut portion contours 5 are produced at respective acute-angled corners.

Figure 6:
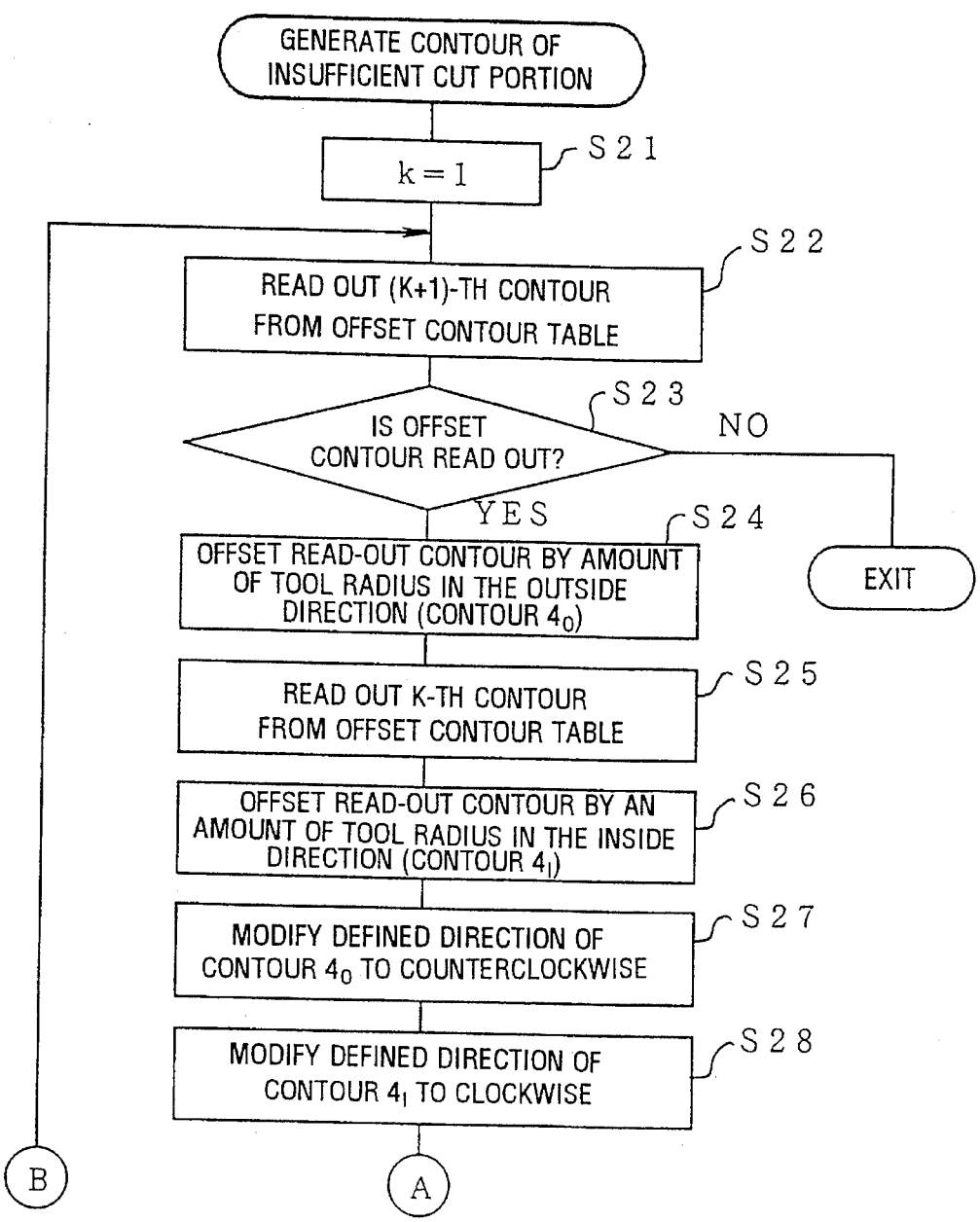
FIG. 6 is a flowchart (No. 1) for illustrating processes. For generating an insufficient cut portion in detail.
Figure 7:
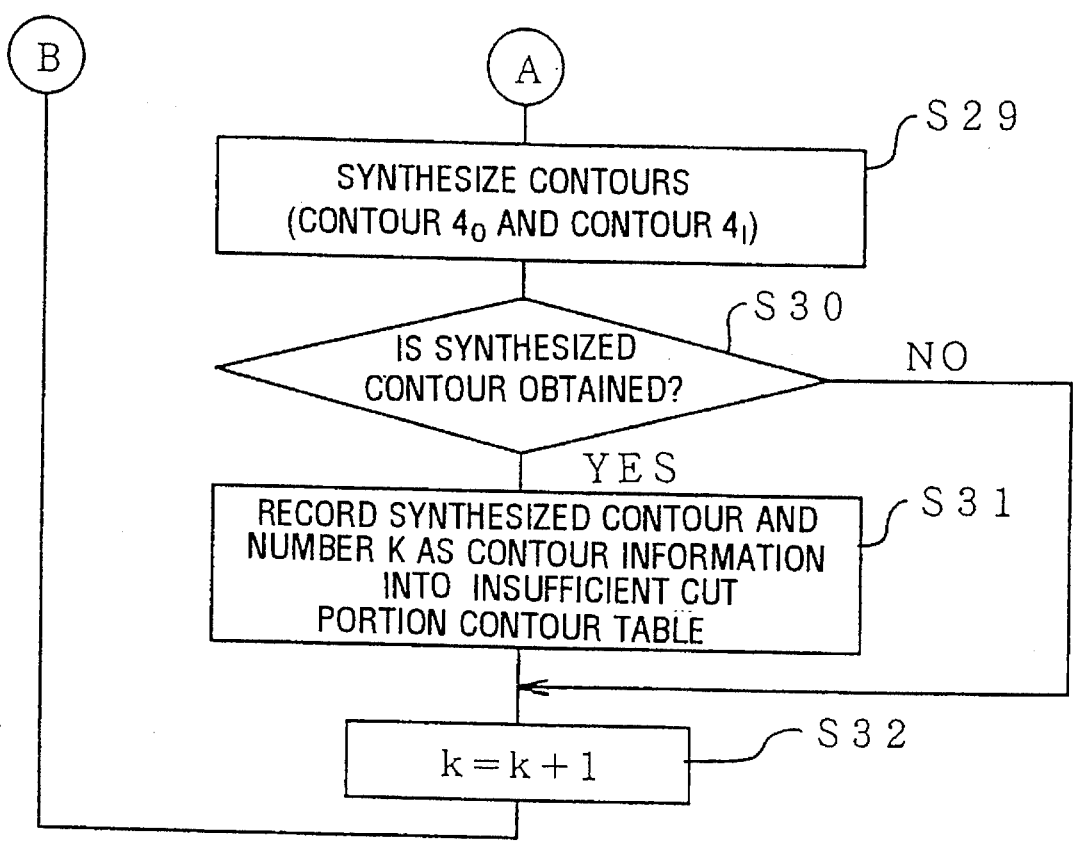
FIG. 7 is a flowchart (No. 2) for illustrating processes for generating an insufficient cut portion in detail.

FIG. 6 and FIG. 7 are flowcharts for illustrating processes for generating an insufficient cut portion contour in detail.

Referring to FIG. 6 and FIG. 7, first, a variable k indicating an offset contour number is initialized to 1 (step S21). Next, the (k+1)-th offset contour $3_{k+1}$ is read out from the offset contour table (step S22). At this time, whether the offset contour $3_{k+1}$ is read out or not is determined (step S23). If the offset contour $3_{k+1}$ is not read out, then flow returns from the processes. If the offset contour $3_{k+1}$ is read out, a contour $4_O$ is obtained by offsetting the read-out offset contour $3_{k+1}$ by an amount of tool radius r in the outside direction (step S24). Similarly, the k-th offset contour $3_k$ is read out from the offset contour table (step S25), and a contour $4_I$ is obtained by offsetting the read-out offset contour $3_k$ by the amount of tool radius r in the inside direction (step S26). Subsequently, the defined direction of the contour $4_O$ is modified to counterclockwise (step S27), and the defined direction of the contour $4_I$ is modified to clockwise (step S28). The flowcharts of FIGS. 6 and 7 are connected at points A and B.

After that, those obtained two contours $4_O$ and $4_I$ are synthesized (step S29), and whether any insufficient cut portion contour (of any synthesized contour) is obtained or nor is determined (step S30). If any synthesized contour is obtained, then the synthesized contour and a number k as the contour information are recorded in the insufficient cut portion contour table (step S31). If no synthesized contour is obtained, then step S31 is skipped. In such a way, the insufficient cut portion contour which exists between k-th offset contour $3_k$ and the (k+1)-th offset contour $3_{k+1}$. Next, in order to check the contour of the insufficient cut portion existing between the offset contour $3_{k+1}$ and the offset contour $3_{k+2}$, (k+1) is assigned to k (step S32) and flow returns to step S22.

Figure 8:
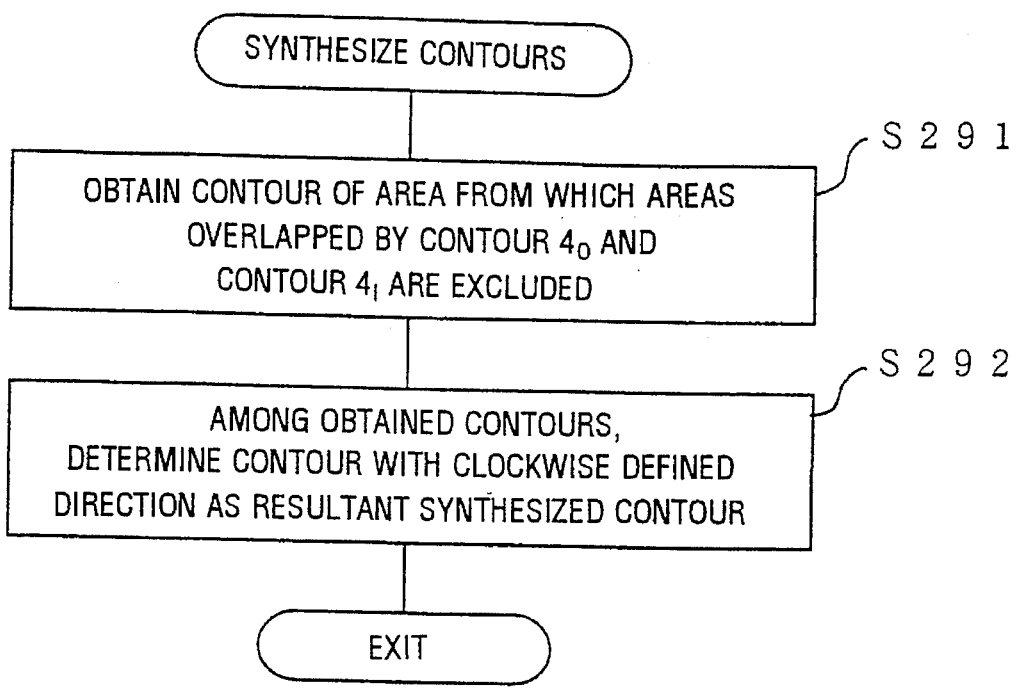
FIG. 8 is a flowchart illustrating processes for synthesizing a contour in detail.

FIG. 8 is a flowchart illustrating a detail of processes for synthesizing contours. Referring to FIG. 8, two profiles of the obtained contours $4_O$ and $4_I$ are overlapped, the area overlapped by these profiles are excluded, and contours of the remaining area are obtained (step S291). Subsequently, among these obtained contours, only the contour having the clockwise defined direction is determined as a resultant synthesized contour (step S292). The synthesized contour acquired by this procedure is the insufficient cut portion contour which exists between k-th offset contour $3_k$ and (k+1)-th offset contour $3_{k+1}$.

In addition to the profile data of the synthesized contour, as the contour information thereof, only k is recorded into the insufficient cut portion contour table. This means that the insufficient cut portion contour is detected between the k-th offset contour $3_k$ and (k+1)-th offset contour $3_{k+1}$, since insufficient cut portion contours are checked from the outside to the inside.

Figure 9:
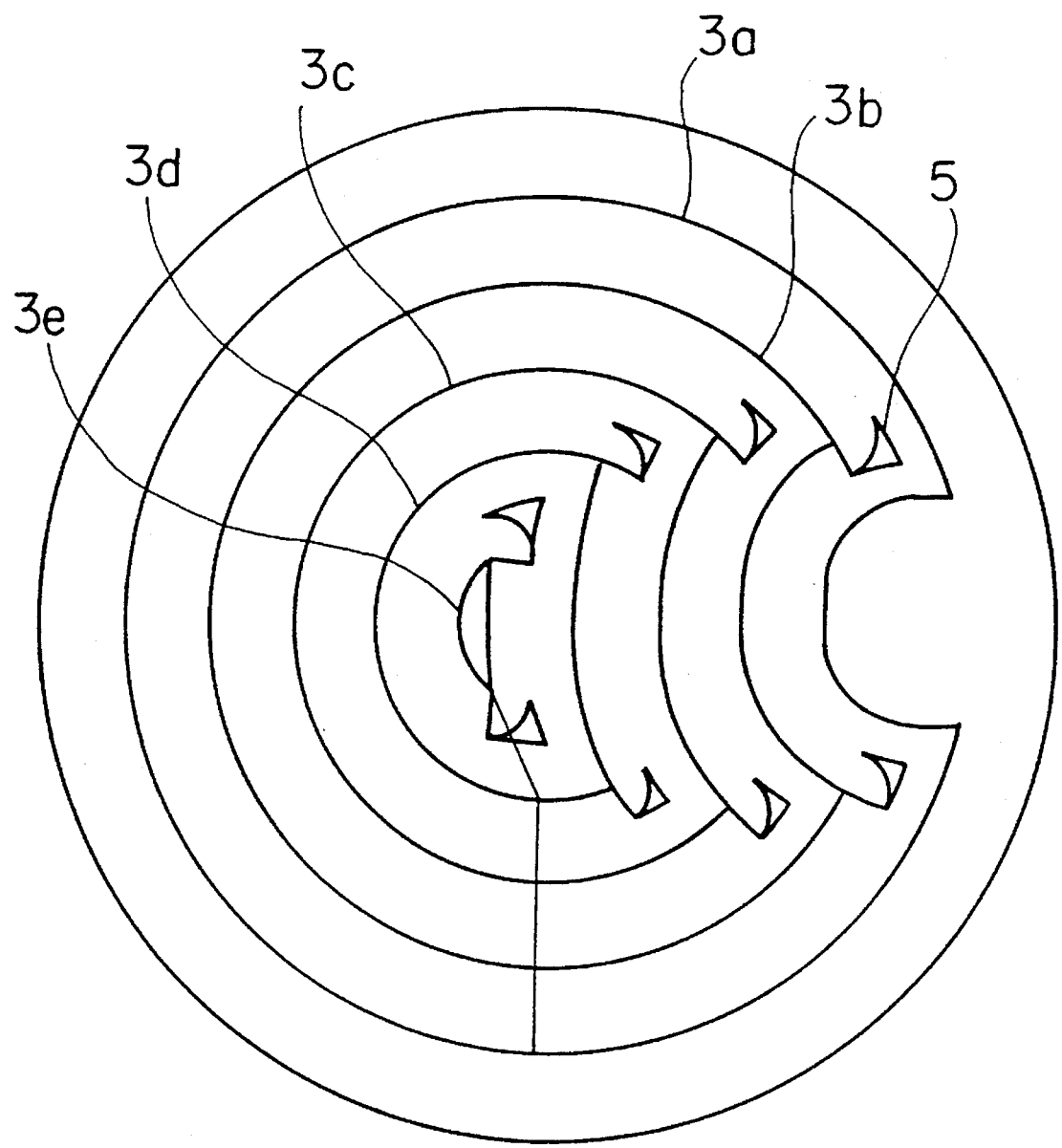
FIG. 9 is an illustrative drawing to show a state when a tool path is obtained.

FIG. 9 is an illustrative drawing to show a state when a tool path is obtained. Referring to FIG. 9, all the offset contours 3a, 3b, 3c, 3d, 3e and all the insufficient cut portion contours are mutually connected with the shortest distance. Accordingly, machining operations proceed as follows. That is, a tool travels tracing an offset contour, and if the tool encounters an insufficient cut portion contour, the tool shifts to the insufficient cut portion contour and traces around the contour once, then returns to the previous offset contour. When the machining of this offset contour ends, the tool shifts to the adjacent offset contour. Machining operations are performed as mentioned above.

Figure 10:
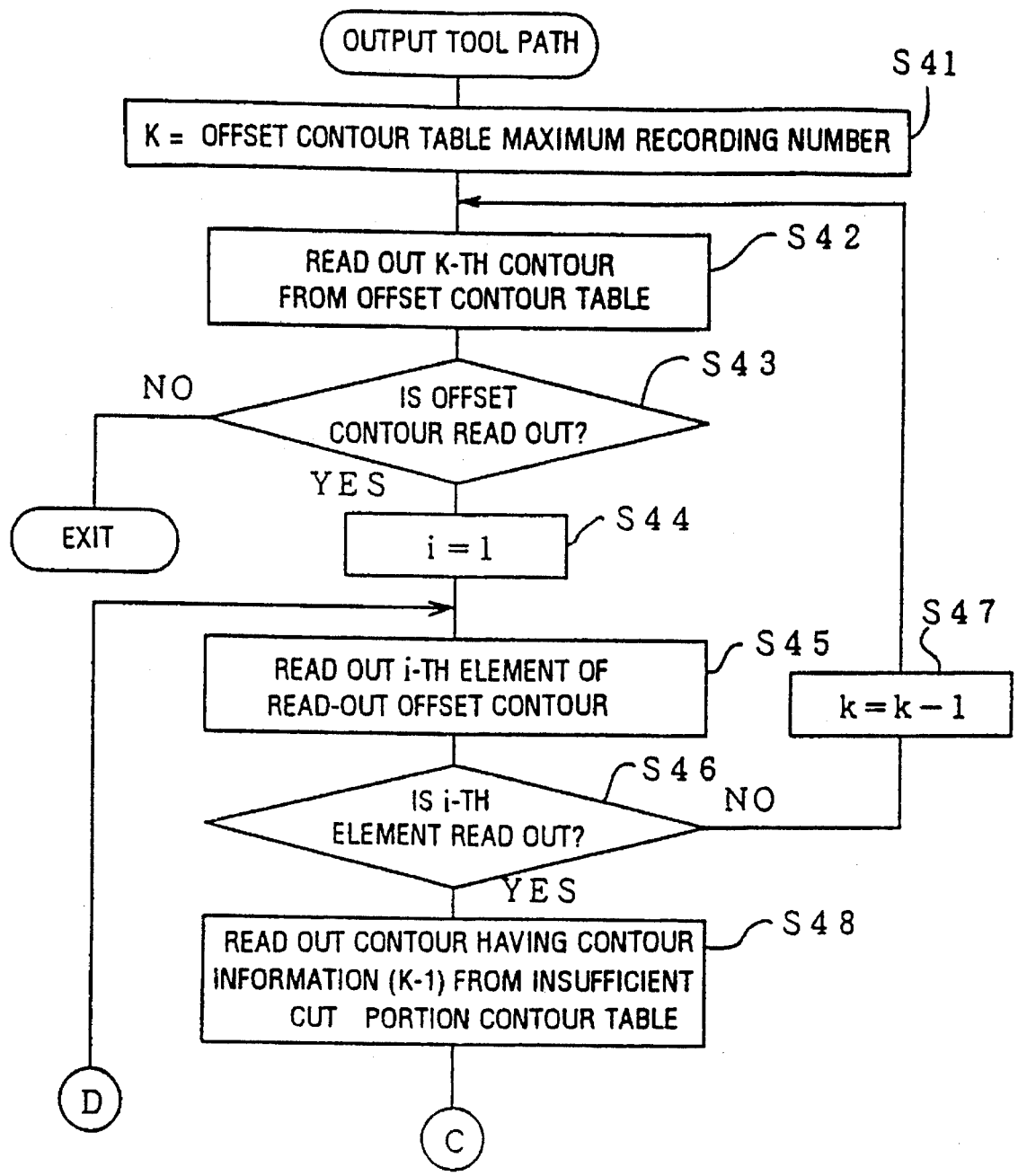
FIG. 10 is a flowchart (No. 1) illustrating processes for outputting a tool path in detail.
Figure 11:
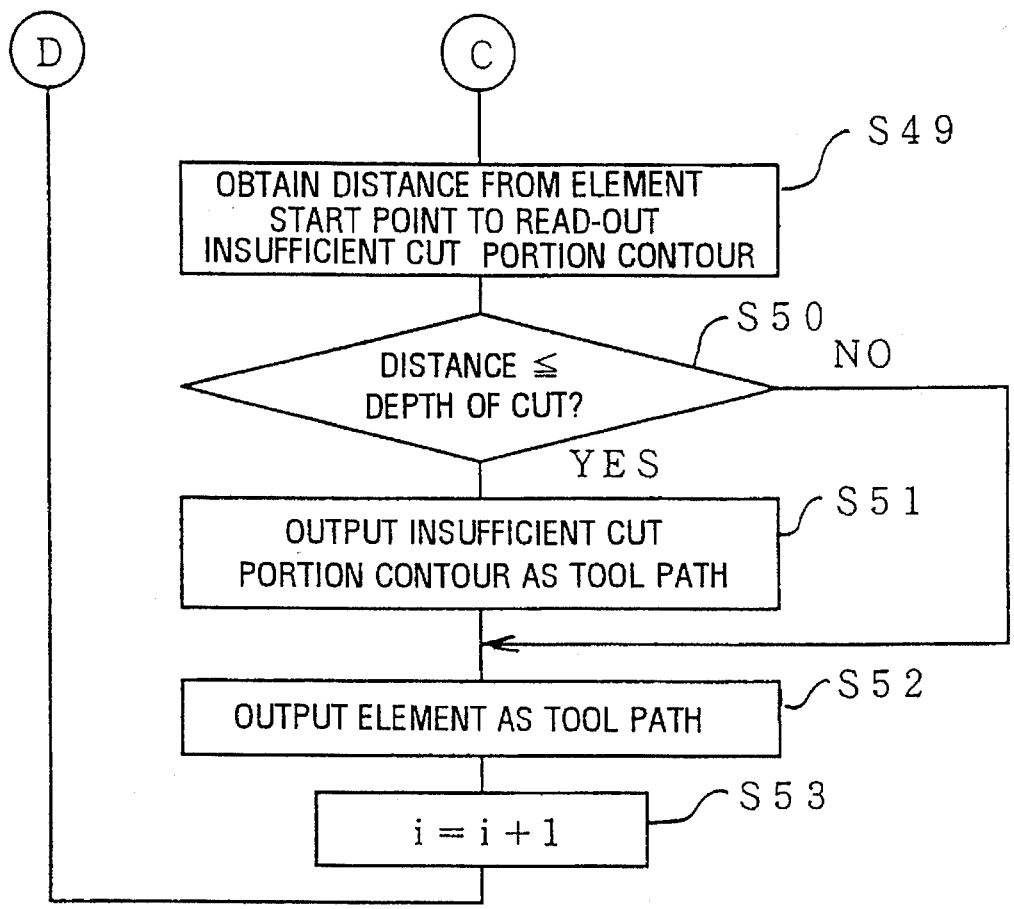
FIG. 11 is a flowchart (No. 2) illustrating processes for outputting a tool path in detail.

FIG. 10 and FIG. 11 are flowcharts each of which is illustrating a detail of tool path outputting processes. The flowcharts of FIGS. 10 and 11 are connected at points C and D.

Referring to FIG. 10 and FIG. 11, first, the maximum number of recorded offset contours in the offset contour table is assigned to a variable k (step S41). Next, the k-th offset contour is read out from the offset contour table (step S42). At this time, whether the offset contour is read out or not is determined (step S43). If the offset contour is not read out, flow returns from the processes. If read out, 1 is assigned to a variable i indicating the number of the element which comprises the offset contour (step S44).

Subsequently, the i-th element of the offset contour read out from the offset contour table is read out (step S45). At this time, whether the i-th element is read out or not is determined (step S46). If the i-th element is not read out, (k-1) is assigned to k (step S47), flow returns to step S42 and tool path outputting processes for the next outside offset contour are started. If the i-th element is read out in step S46, then the contour having the (k-1) contour information is read out from the insufficient cut portion contour table, and the insufficient cut portion contour which is present between the (k-1)-th and k-th offset contours is read out (step S48).

After that, the distance from the starting point of the i-th element to the insufficient cut portion contour which is previously read-out is obtained (step S49). Whether the obtained distance is equal or less than the amount of depth of cut is determined (step S50). If the distance is equal or less than the amount of depth of cut, then the insufficient cut portion contour is outputted as a tool path (step S51). If the distance exceeds the amount of depth of cut, flow skips step S51, outputs the i-th element as a tool path (step S52), increments i by 1 for the next element check (step S53), and returns to step S45.

In the illustrated example, the method of determining tool paths from the inside to the outside is employed, however, tool paths may be generated from the outside to the inside.

Figure 12:
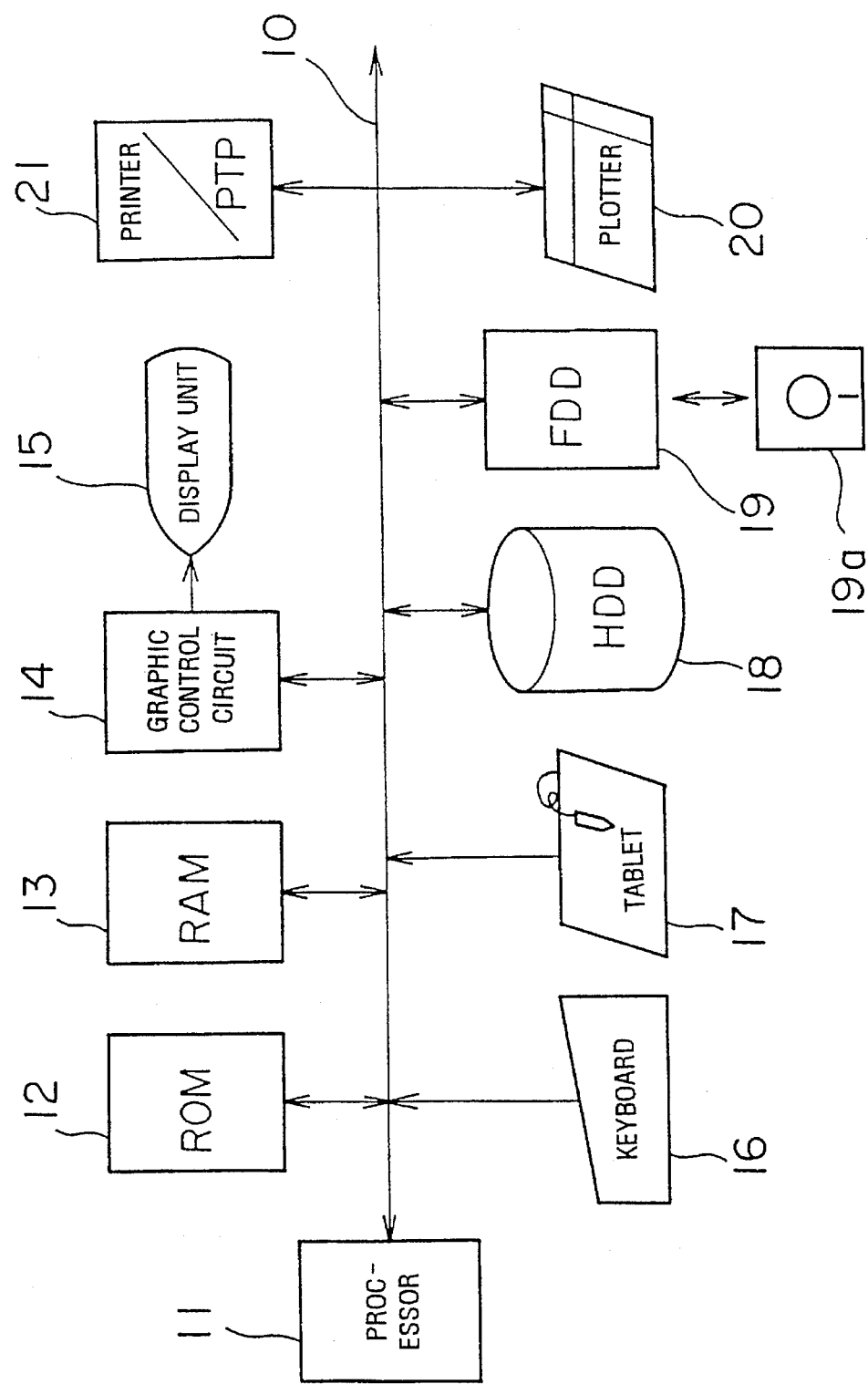
FIG. 12 is a block diagram of a hardware of an automatic programming apparatus for implementing the present invention.

FIG. 12 is a block diagram of a hardware of an automatic programming apparatus for implementing the present invention.

Referring to FIG. 12, the automatic programming apparatus comprises a processor 11, a read only memory (ROM) 12, a main memory (RAM) 13, a graphic control circuit 14, a display unit (15), a keyboard 16, a tablet 17, a hard disk drive (HDD) 18, a floppy disk drive (FDD) 19, a plotter 20 and a printer/paper tape puncher (PTP) 21, and these components are mutually connected by means of a bus 10.

The processor 11 controls the automatic programming apparatus in its entirety in accordance with a system program stored in the ROM 12. The main memory 13 stores a part profile contour and various machining conditions set when an area machining method is implemented, an offset contour table generated in the course of executing the area machining method, a part program prepared for the area machining, etc.

The graphic control circuit 14 converts the display data from the processor 11 to display signals, and supplies the display signals to the display unit 15 which displays a screen in response to the display signals. As the display unit 15, a cathode ray tube (CRT), a liquid crystal display, or the like may be employed.

The keyboard 16 comprises operation keys used for inputting data, function keys, etc. The tablet 17 is used for inputting data for profile information.

The HDD 18 stores data such as prepared part programs which are required to be kept after power is turned off. The FDD 19 can read out a part program by driving a floppy disk 19a and write a prepared or edited part program into the floppy disk 19a.

The part program prepared by the automatic programing apparatus can be outputted to the plotter 20 and the printer/paper tape puncher 21.

As mentioned above, in accordance with the present invention, when generating a tool path for area machining capable of removing within an specified optional area using an automatic programming apparatus, an insufficient cut portion contour is generated after generation of offset contours in advance. An offset contour is outputted as a tool path in principle. Near an insufficient cut portion contour, however, the tool path is shifted to the insufficient cut portion contour. Thereby area machining without insufficient cut portion becomes possible if any insufficient cut occurs in the stage of generating offset contours.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An area machining method of removing portions within a specified optional area in a workpiece, using an automatic programming apparatus comprising the steps of:

setting a part profile contour and a plurality of machining conditions;

obtaining an outmost offset contour which is offset from said part profile contour by at least an amount of a tool radius in an inside direction, and obtaining a plurality of additional offset contours which are offset sequentially from said outmost offset contour by an amount of a depth of cut in the inside direction;

obtaining a plurality of insufficient cut portion contours each of which is produced between adjacent said plurality of offset contours and represents contours of uncut workpiece portions between said adjacent offset contours; and outputting a plurality of tool paths each of which connects between corresponding said adjacent offset contours and between each of said offset contours and each of corresponding said insufficient cut portion contours with a shortest distance, thereby removing said uncut workpiece portions.

2. An area machining method according to claim 1, wherein said step of obtaining said offset contours further includes a step of storing said obtained offset contours into an offset contour table.

3. An area machining method according to claim 1, wherein said step of obtaining said insufficient cut portion contours further includes steps of obtaining a first contour and a second contour, the first and the second contours obtained by offsetting from a given offset contour by an amount of a tool radius in an outside and the inside direction, respectively, specifying a defined direction of said first contour as a first direction, specifying a defined direction opposite to said first direction of said second contour direction as a second direction, obtaining contours of a portion from which areas overlapped by said first or second contour are excluded, and determining, among the obtained contours, only the contour whose defined direction is said second direction as an insufficient cut portion contour.

4. An area machining method according to claim 1, wherein said step of obtaining said insufficient cut portion contours comprises obtaining first an insufficient cut portion contour from an area between an outmost offset contour and the next offset contour adjacent to said outmost offset contour, then obtaining subsequent insufficient cut portion contours in sequence from an outside to the inside direction.

5. An area machining method according to claim 3, wherein the first direction specifying the defined direction of said first contour is counterclockwise, and the second direction specifying the defined direction of said second contour is clockwise.

6. An area machining method according to claim 1, wherein said step of obtaining said insufficient cut portion contours further includes a step of storing said insufficient cut portion contours into an insufficient cut portion contour table.

7. An area machining method according to claim 1, wherein said step of outputting said tool paths comprises outputting a tool path between an inmost one of said offset contours and one of said insufficient cut portion contours or another one of said offset contours, said one insufficient cut portion contour and said one offset contour located outside of or adjacent to said inmost offset contour, then outputting subsequent tool paths in sequence from the inside to an outside direction.

8. An area machining method according to claim 1, wherein said step of outputting said tool paths further includes a step of obtaining a path such that a distance between each of start points of elements comprising each of said offset contours and a corresponding one of said insufficient cut portion contours becomes shortest.

9. An area machining method according to claim 8, wherein said step of obtaining the shortest paths further comprises outputting a tool path between said each of element starting points and corresponding insufficient cut portion contour when said distance between each of element start points and corresponding insufficient cut portion contours does not exceed an amount of depth of cut.

* * * * *